United States Patent
Fukui et al.

(10) Patent No.: US 7,283,833 B2
(45) Date of Patent: Oct. 16, 2007

(54) PUSH TO TALK SYSTEM

(75) Inventors: Yujiro Fukui, Higashiosaka (JP); Hiroyuki Ueda, Suita (JP); Yoichi Kakimoto, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/168,177

(22) Filed: Jun. 28, 2005

(65) Prior Publication Data
US 2006/0003783 A1 Jan. 5, 2006

(30) Foreign Application Priority Data
Jun. 30, 2004 (JP) ............................. 2004-194524

(51) Int. Cl.
*H04Q 7/20* (2006.01)
(52) U.S. Cl. ...................... 455/517; 455/518; 455/519; 455/414.3; 455/414.1; 455/500; 455/456.5; 370/259; 370/271
(58) Field of Classification Search ................ 455/517, 455/518, 519, 520, 516, 414.3, 414.1, 500, 455/39, 456.5; 370/259–271
See application file for complete search history.

(56) References Cited
U.S. PATENT DOCUMENTS 7,177,627 B2 * 2/2007 Melaku et al. ............ 455/414.1

| | | | |
|---|---|---|---|
| 2004/0047460 A1 | 3/2004 | Adams et al. | |
| 2004/0162095 A1 * | 8/2004 | Edwards et al. | ............. 455/518 |
| 2004/0196826 A1 * | 10/2004 | Bao et al. | .................... 370/352 |
| 2005/0054352 A1 * | 3/2005 | Karaizman | ................ 455/456.3 |
| 2006/0019689 A1 * | 1/2006 | Pantalone et al. | ........... 455/518 |

FOREIGN PATENT DOCUMENTS

| | | |
|---|---|---|
| JP | 2002-152384 | 5/2002 |
| JP | 2002-536928 | 10/2002 |
| JP | 2003-219047 | 7/2003 |
| WO | 03/010986 | 2/2003 |

* cited by examiner

Primary Examiner—Rafael Perez-Gutierrez
Assistant Examiner—Khai Nguyen

(57) ABSTRACT

To provide a PTT system that includes a plurality of PTT-capable mobile phones each including a display unit, and a server which mediates a PTT call between mobile phones out of the plurality of mobile phones. The server includes a storage unit, a retrieval unit, and a sending unit. The storage unit stores images of users of the plurality of mobile phones and phone identifiers of the plurality of mobile phones in correspondence with each other. The retrieval unit retrieves, from the storage unit, an image corresponding to a phone identifier of a mobile phone involved in the PTT call. The sending unit sends the retrieved image to at least one other mobile phone involved in the PTT call. A display unit in the at least one other mobile phone displays the image sent from the server.

8 Claims, 18 Drawing Sheets

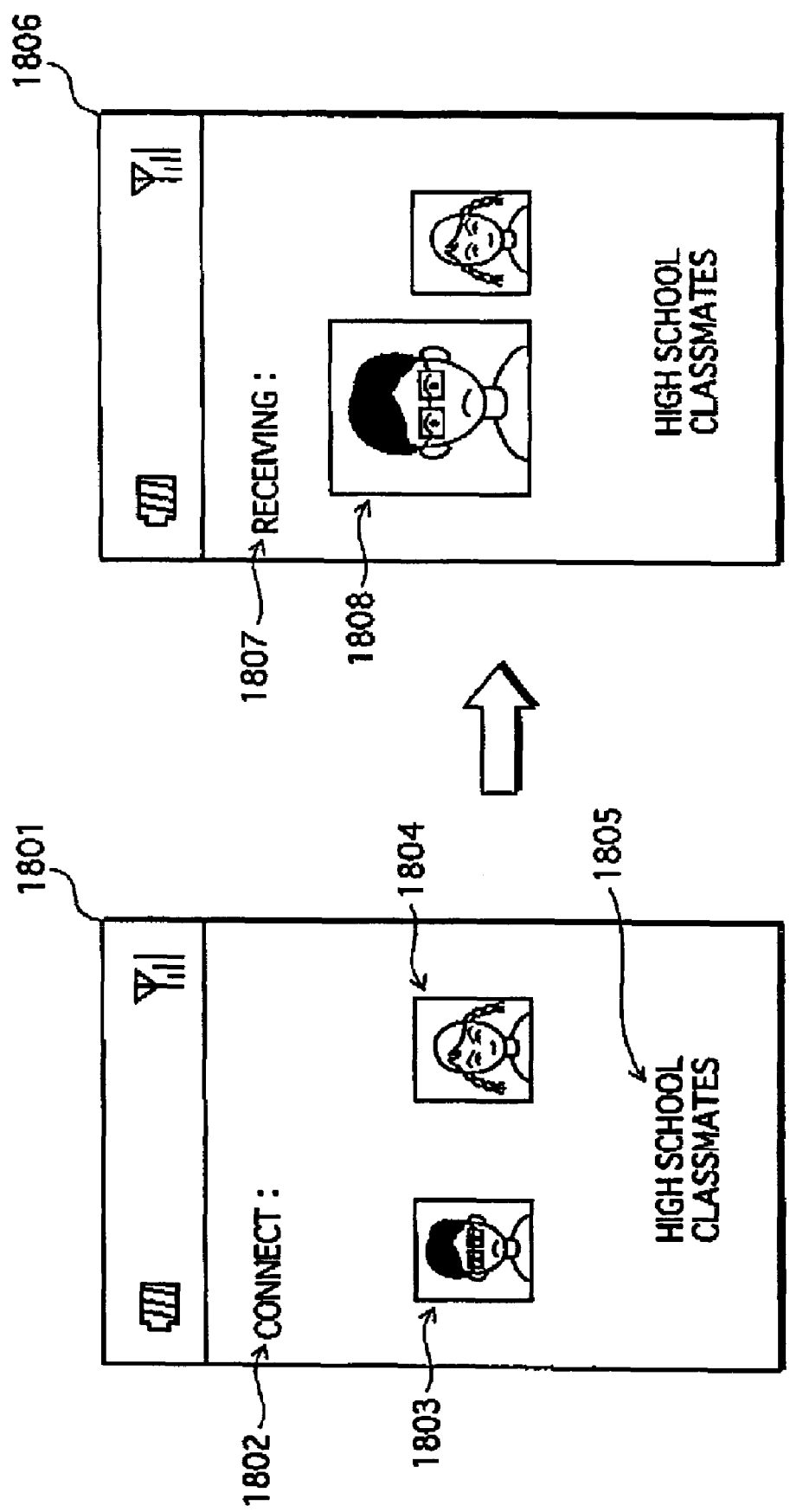

PUSH TO TALK SYSTEM

This application is based on an application No. 2004-194524 filed in Japan, the contents of which are hereby incorporated by reference.

BACKGROUND OF THE INVENTION

1. Field of the Invention

The present invention relates to a push to talk (PTT) system. The present invention in particular relates to techniques of displaying, on each mobile phone in a PTT call, information about the other participant(s).

2. Related Art

Currently, mobile phones which have a PTT function based on VOIP (Voice over Internet Protocol) are widely used in North America.

PTT is explained briefly below.

To initiate a PTT call from a PTT-capable mobile phone, first the mobile phone logs in to a server which mediates PTT calls. The mobile phone then designates another PTT-capable mobile phone as a called party, by ID information used for PTT (hereafter "PTT call ID").

If the mobile phone designated by the PTT call ID has already logged in to the server, that is, if the designated mobile phone is in an answerable state, a user of the mobile phone can transmit voice communication to the designated mobile phone by pushing a PTT button provided on the mobile phone. Also, by releasing the PTT button, the user can receive voice communication from the designated mobile phone.

A PTT-capable mobile phone stores a PTT directory. The PTT directory is a database for recording and browsing information about contacts (such information is hereafter referred to as "contact information"). A contact mentioned here is a user of another PTT-capable mobile phone who has been established in the PTT directory by a user of the mobile phone.

Contact names showing names of the contacts and PTT call IDs of mobile phones of the contacts can be recorded in the PTT directory as the contact information. Such contact information is displayed on the mobile phone when the user of the mobile phone browses the PTT directory, receives an incoming PTT call, or engages in a PTT conversation.

Conventionally, contact information that can be recorded in a PTT directory is limited to character information. This being so, even if the user views the contact information displayed on the mobile phone when browsing the PTT directory, receiving an incoming PTT call, or engaging in a PTT conversation, he or she may not be able to easily identify a contact represented by the contact information.

Suppose a contact name "Sato" is displayed on a called party's mobile phone as contact information of a calling party upon reception of an incoming PTT call. If the called party knows more than one person whose name is Sato, it is difficult for the called party to identify which Sato is calling.

SUMMARY OF THE INVENTION

In view of the above problem, the present invention aims to provide a PTT system that can display, on each mobile phone involved in a PTT call, an image of the other participant(s) to help a user of the mobile phone easily identify the other participant(s). The present invention also aims to provide various techniques relating to the PTT system.

The stated aim can be achieved by a PTT system that includes a plurality of PTT-capable mobile phones each including a display unit, and a server which mediates a PTT call between mobile phones out of the plurality of mobile phones, the server including: a storage unit operable to store images of users of the plurality of mobile phones and phone identifiers of the plurality of mobile phones in correspondence with each other; a retrieval unit operable to retrieve, from the storage unit, an image corresponding to a phone identifier of a mobile phone involved in the PTT call; and a sending unit operable to send the retrieved image to at least one other mobile phone involved in the PTT call, wherein a display unit in the at least one other mobile phone displays the image sent from the server.

The stated aim can also be achieved by a server for mediating a PTT call between mobile phones out of a plurality of PTT-capable mobile phones, including: a storage unit operable to store images of users of the plurality of mobile phones and phone identifiers of the plurality of mobile phones in correspondence with each other; a retrieval unit operable to retrieve, from the storage unit, an image corresponding to a phone identifier of a mobile phone involved in the PTT call; and a sending unit operable to send the retrieved image to at least one other mobile phone involved in the PTT call.

According to the above construction, the server sends, to a mobile phone in a PTT call, an image corresponding to a phone identifier of at least one of the other mobile phones. The mobile phone displays the image sent from the server as the image of the other participant(s) in the PTT call. Upon viewing the displayed image, the user can instantly recognize the other participant(s).

Also, since the image of the other participant(s) is sent from the server, the mobile phone can display the image with there being no need to store the image in its PTT directory or the like beforehand.

Here, the PTT call may be a group call between the mobile phones that belong to one group, wherein the storage unit stores a group identifier of the group, in correspondence with images of users of the mobile phones and phone identifiers of the mobile phones, and the retrieval unit retrieves, from the storage unit, an image corresponding to a phone identifier of each of the mobile phones that belong to the group identified by the group identifier.

According to the above construction, the mobile phone can receive and display the images of the rest of the participants in the group call. Upon viewing the displayed images, the user can recognize the other participants without difficulty.

Here, the server may further include a PTT mediation unit operable to determine one of the mobile phones as a transmitting mobile phone from which a voice is transmitted, wherein each time the PTT mediation unit changes the transmitting mobile phone, the sending unit sends a phone identifier of the transmitting mobile phone to the at least one other mobile phone, and in the at least one other mobile phone, if the phone identifier of the transmitting mobile phone which is different from a phone identifier of the at least one other mobile phone is sent from the server when images of users of two or more mobile phones including the transmitting mobile phone are being displayed, the display unit makes an image of a user of the transmitting mobile phone identified by the sent phone identifier, different in display style from an image of a user of each of the two or more mobile phones other than the transmitting mobile phone.

Here, the display unit may make the image of the user of the transmitting mobile phone different in display style, by making the image of the user of the transmitting mobile phone larger in display size than the image of the user of each of the two or more mobile phones other than the transmitting mobile phone.

According to the above construction, the user can identify the current speaker in the group call without difficulty.

Here, each of the plurality of mobile phones may further include a request sending unit operable to send, to the server, a request to register an image of a user and a phone identifier thereof, and a request to register an image of a user and a phone identifier of another mobile phone.

The stated aim can also be achieved by a PTT-capable mobile phone including a display unit operable to display, in a PTT call between PTT-capable mobile phones including the mobile phone, an image of a user of each of the mobile phones other than the mobile phone.

Here, the mobile phone may further include a request sending unit operable to send, to the server, a request to register an image of a user and a phone identifier of the mobile phone, and a request to register an image of a user and a phone identifier of another mobile phone.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

Figure 10:
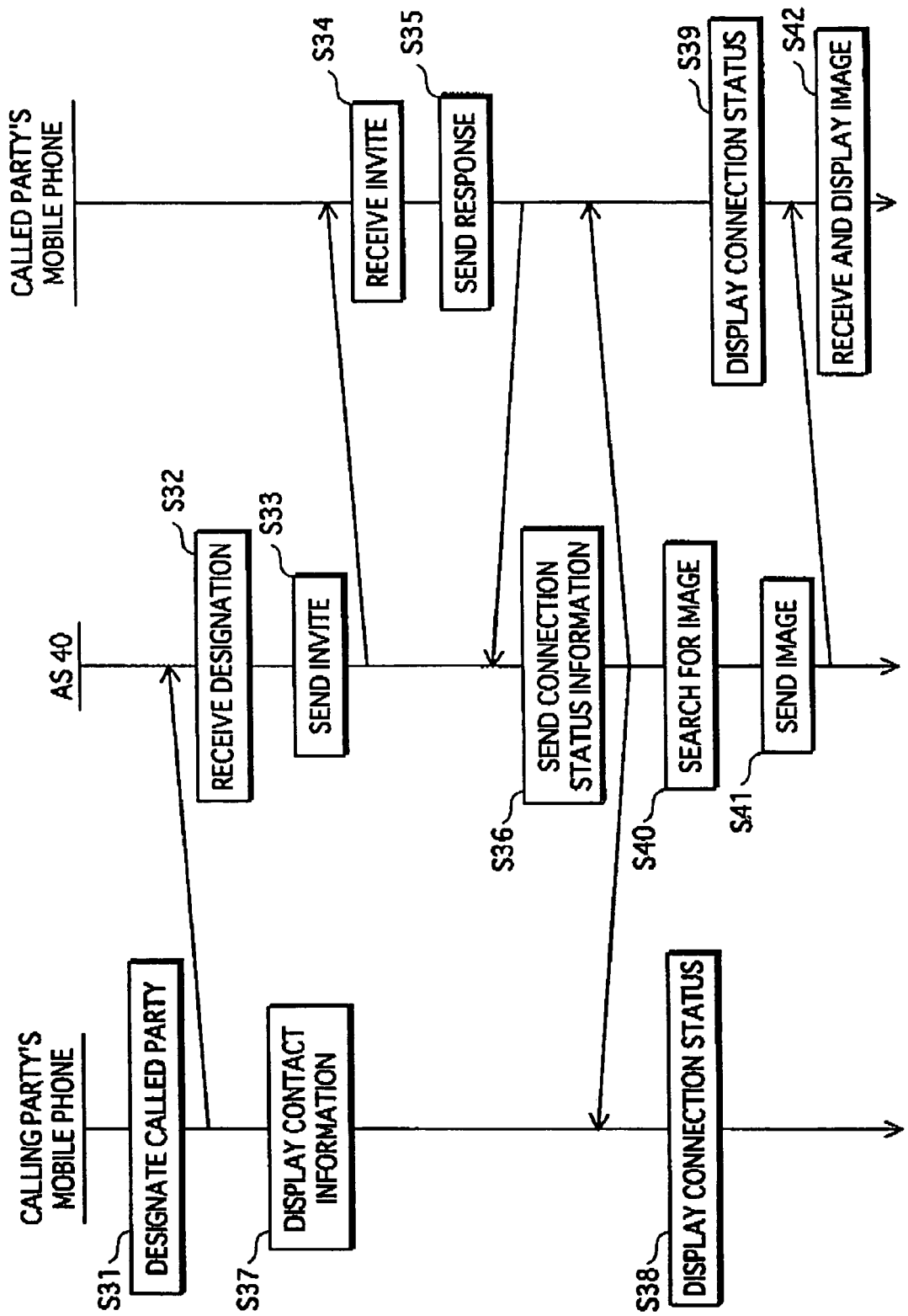
Figure 11:
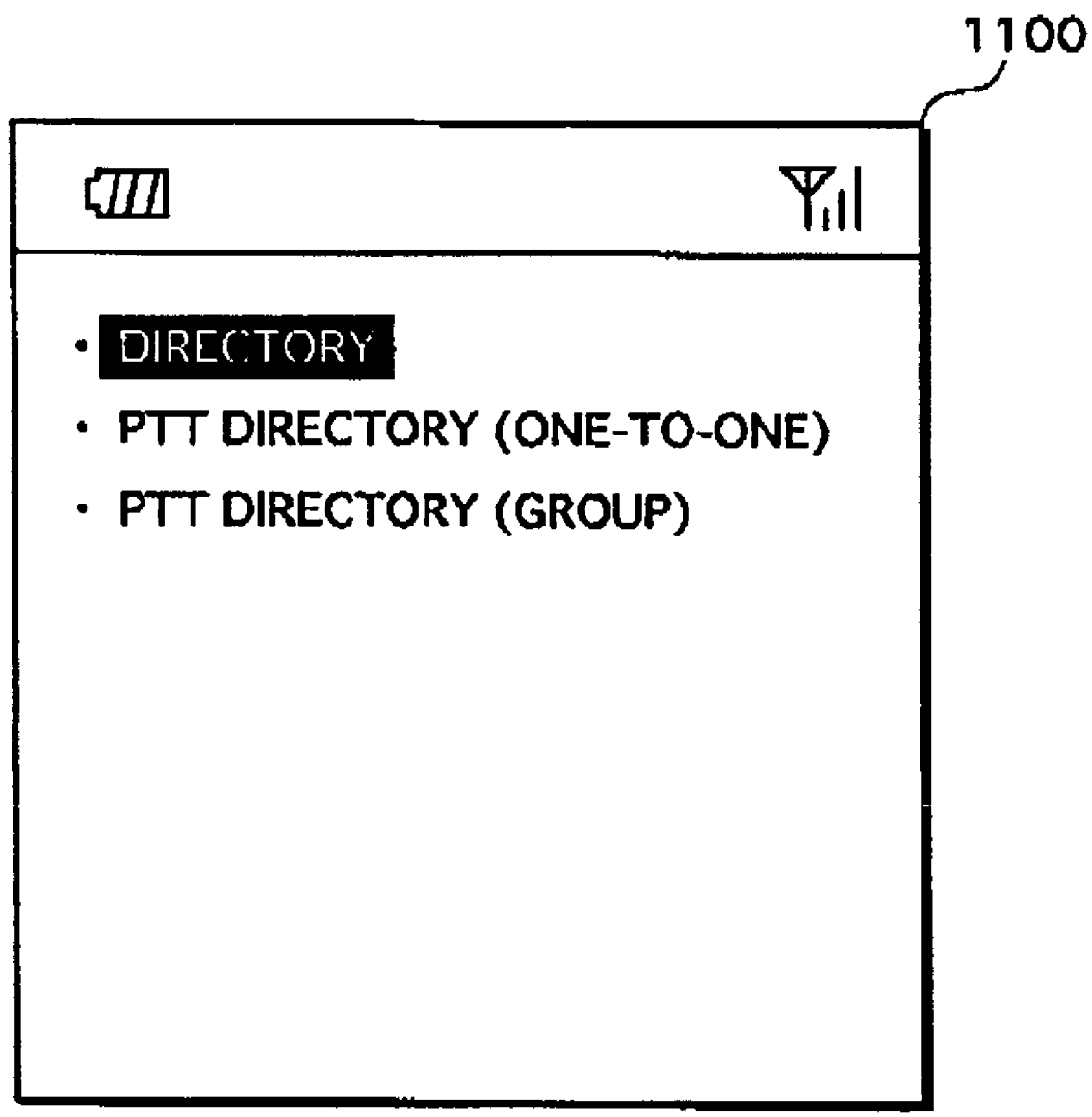
Figure 12:
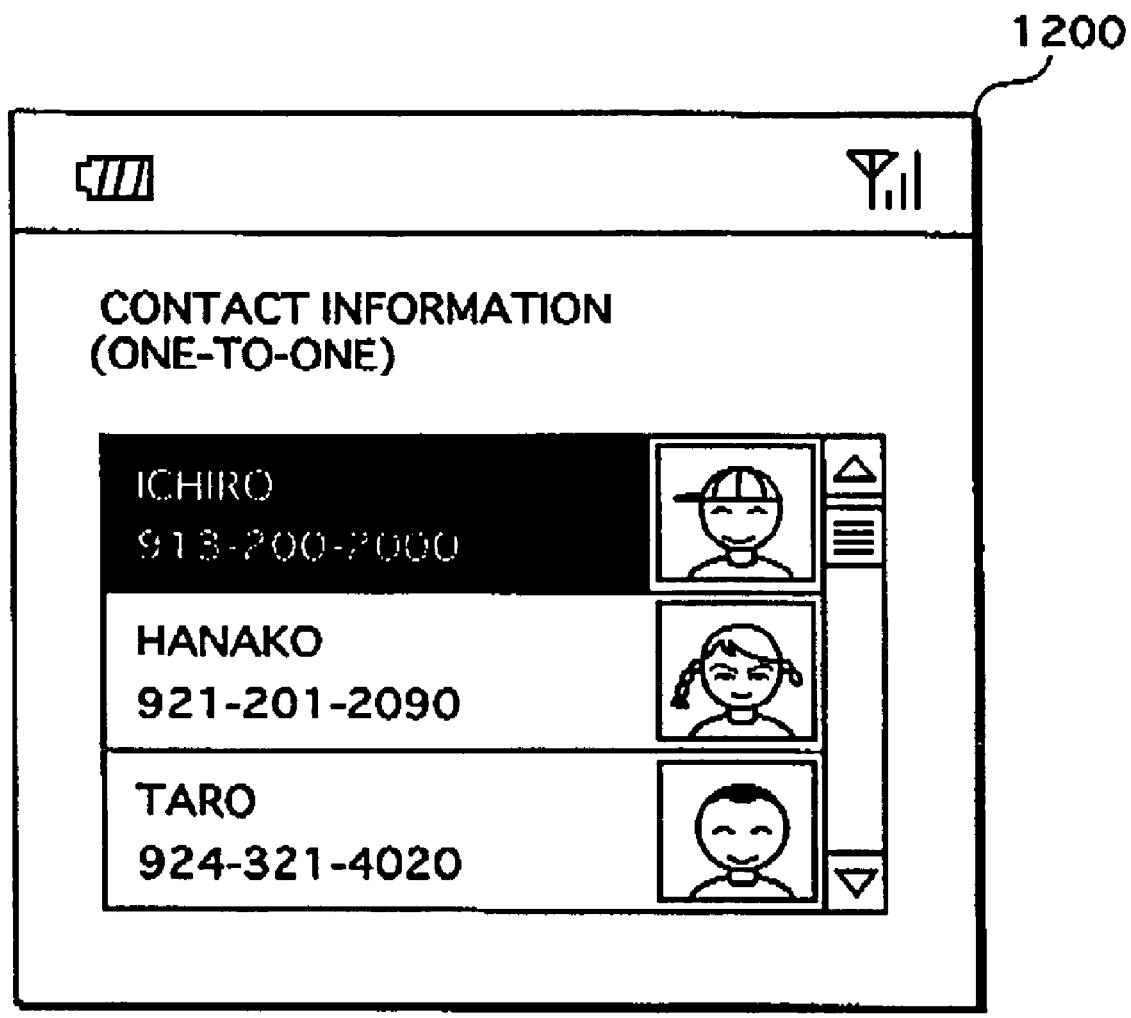
Figure 13:
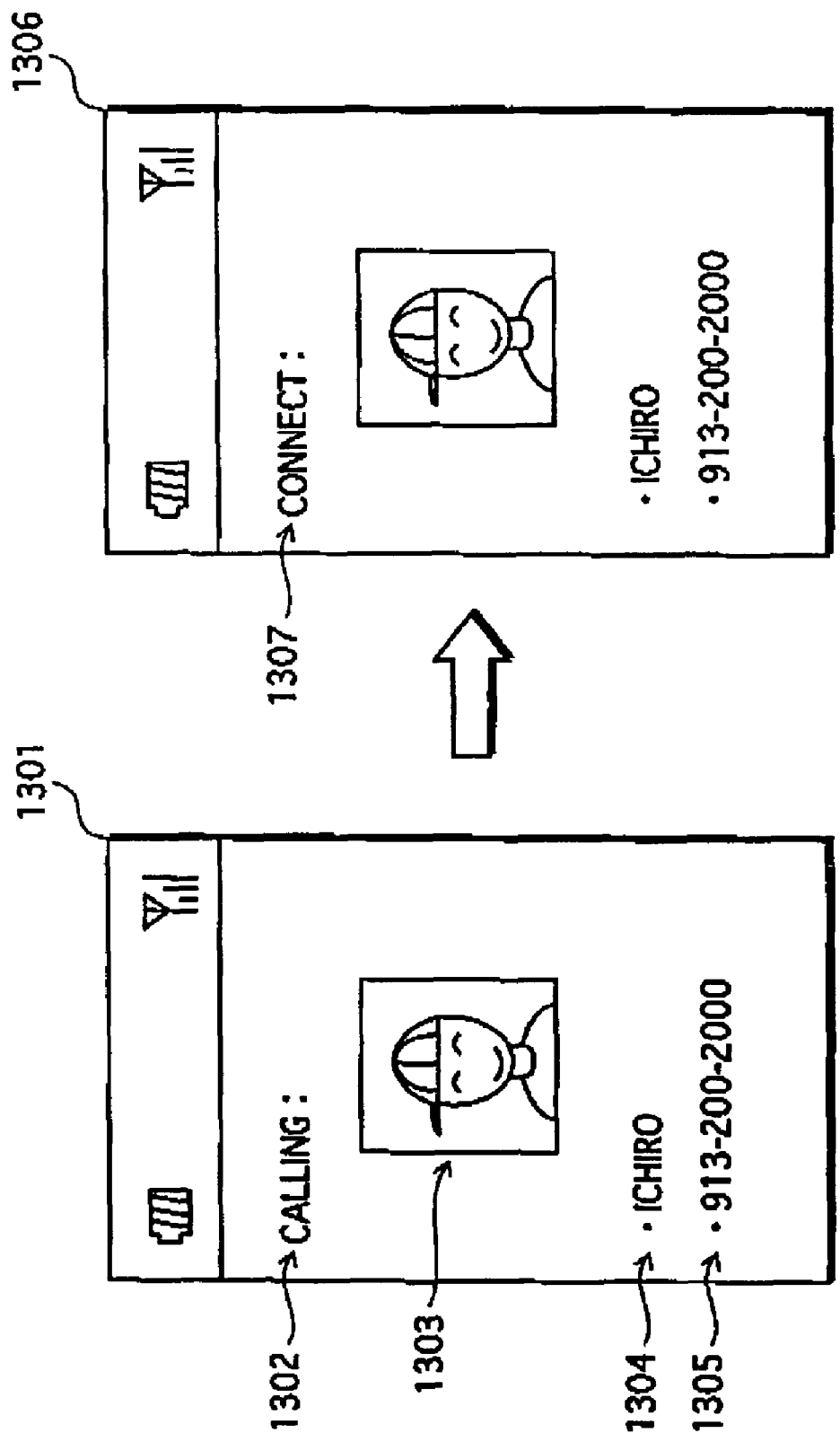
Figure 14:
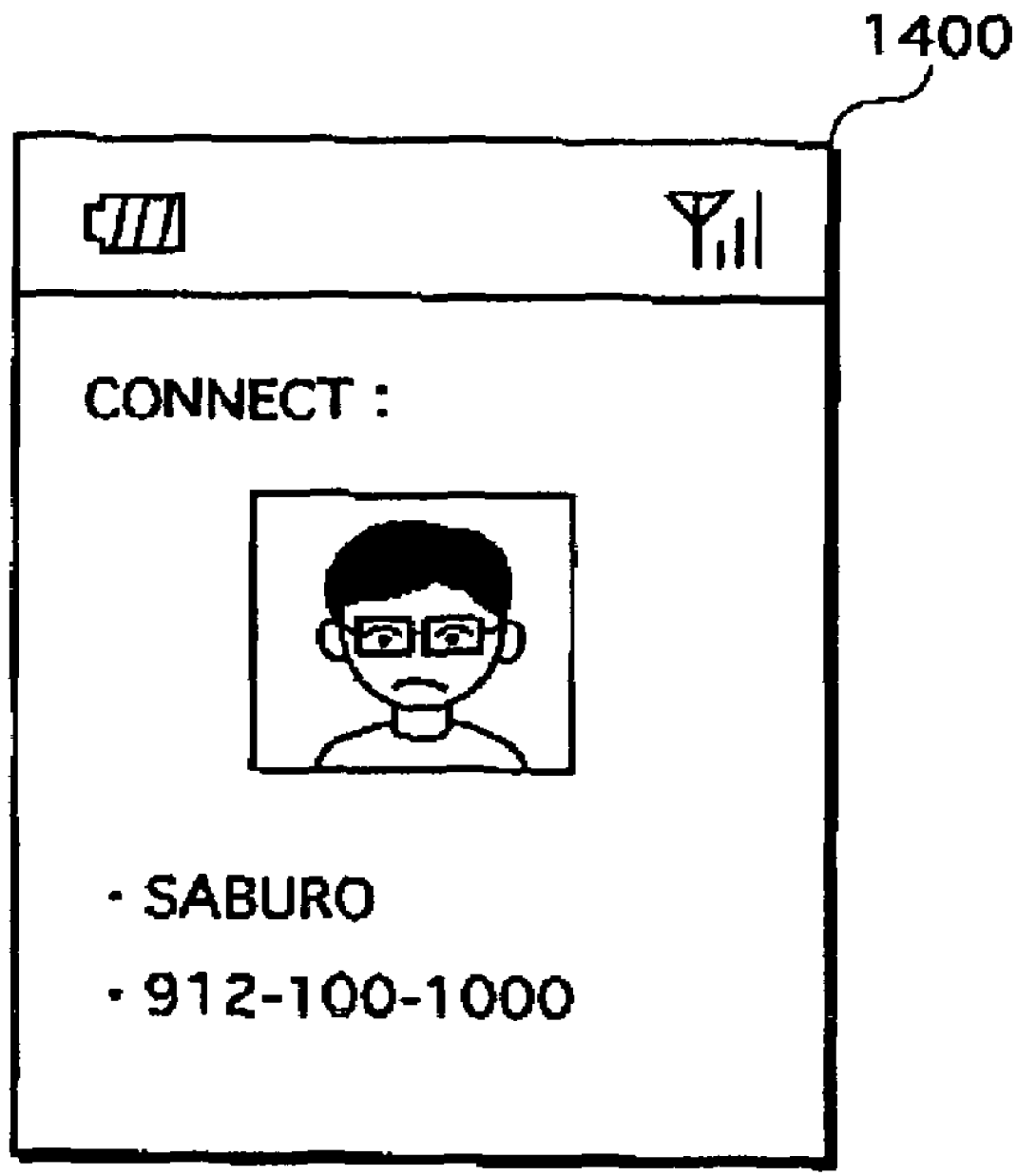
Figure 15:
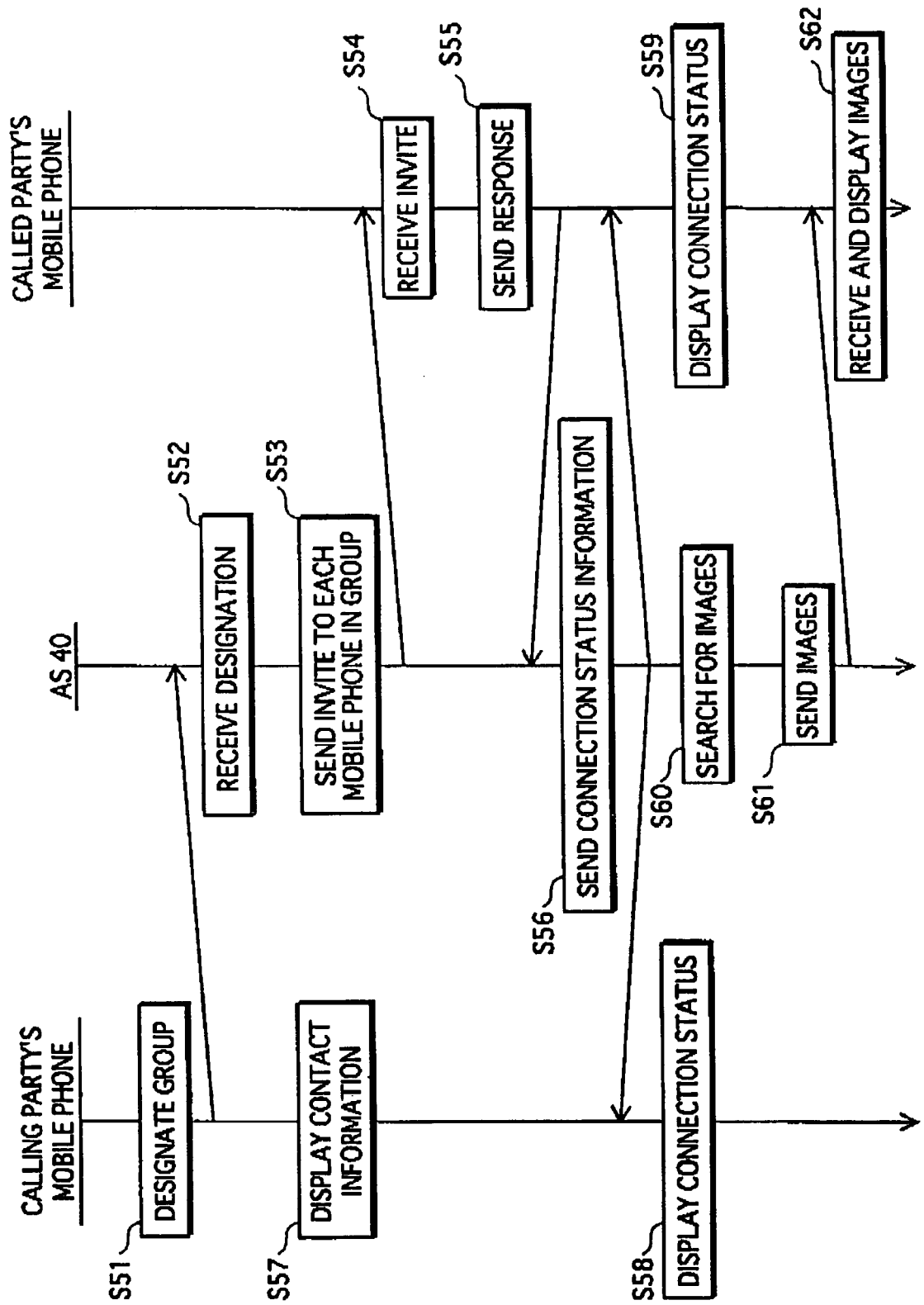
Figure 16:
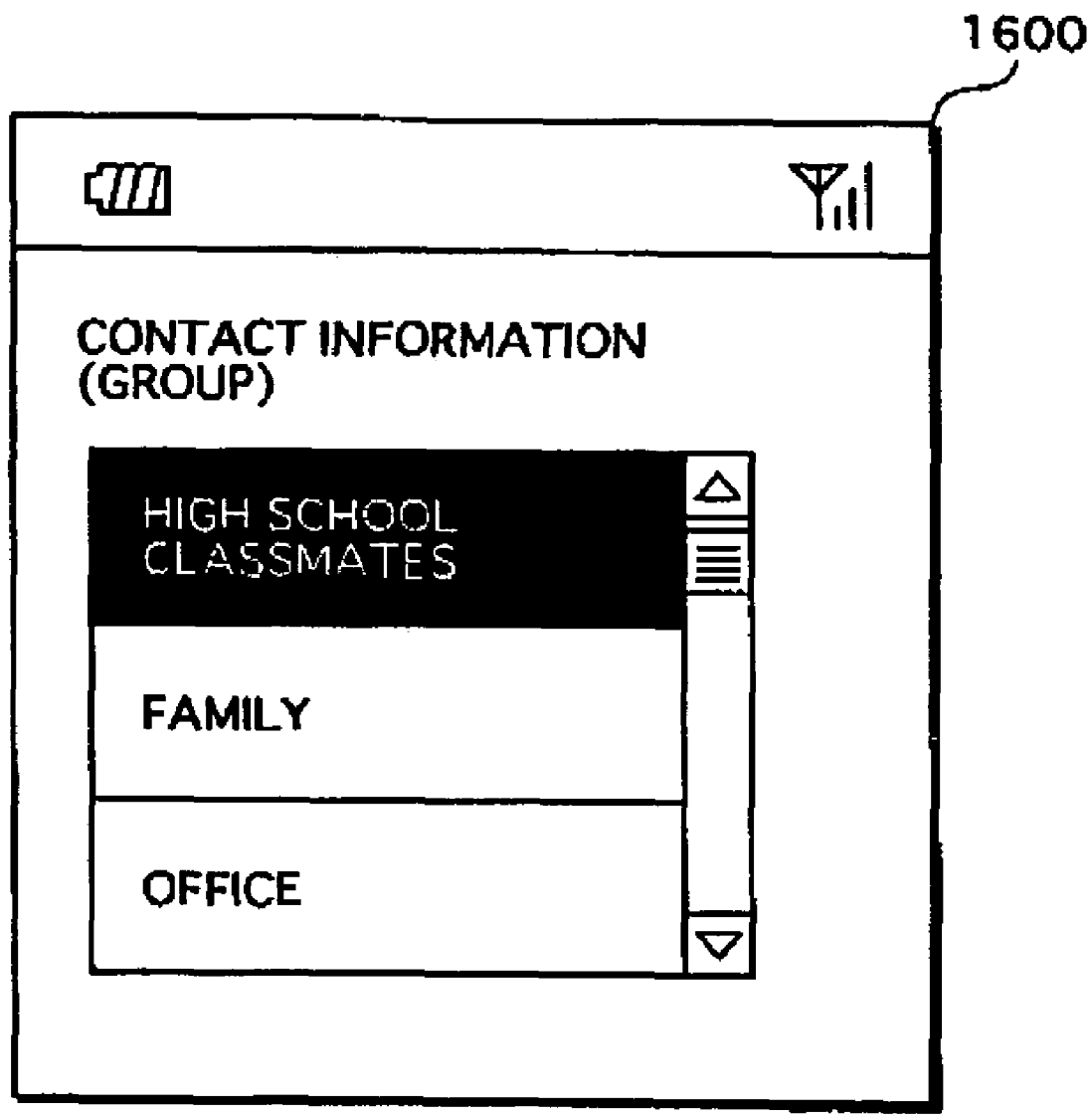
Figure 17:
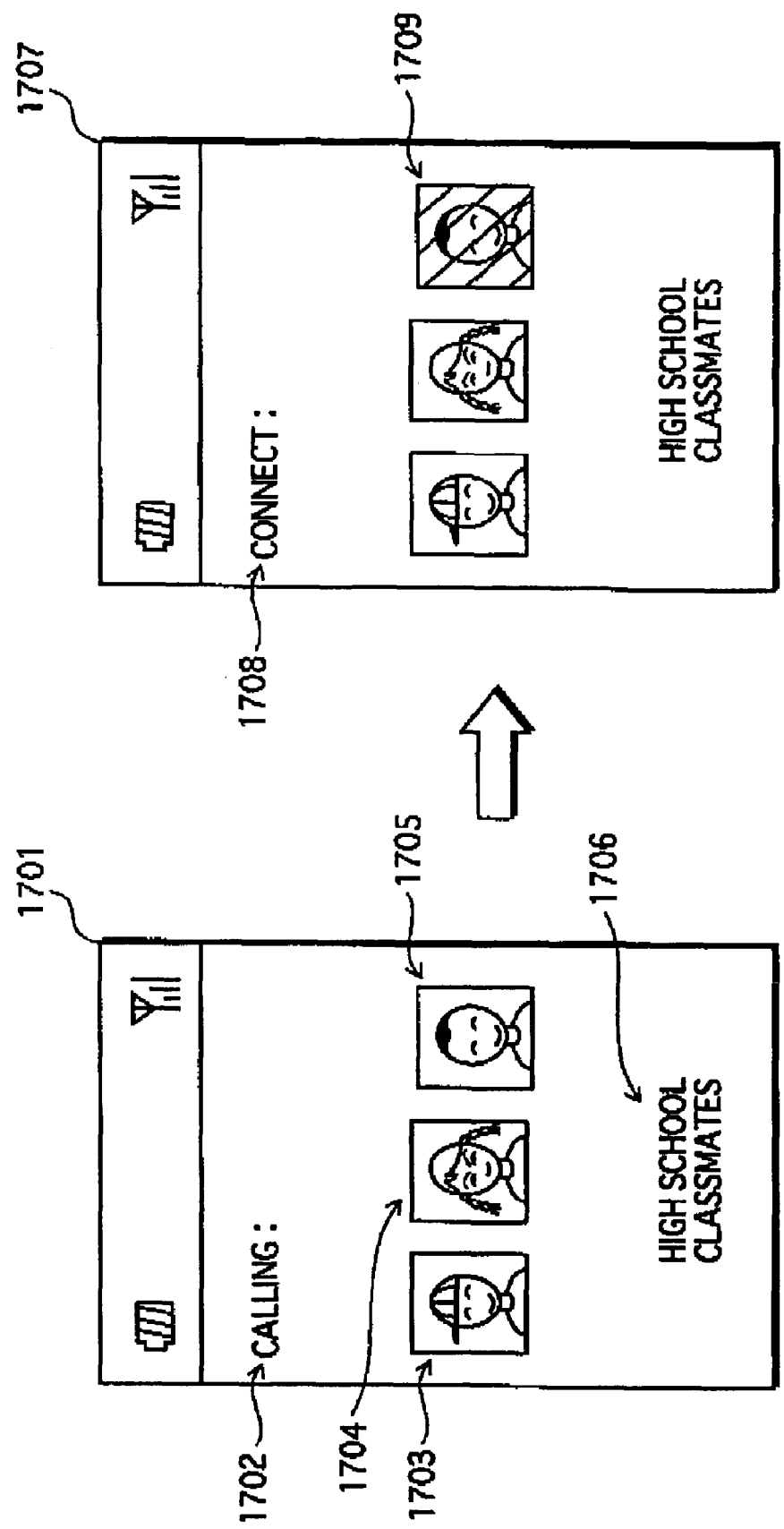

PIG. 9 is a flowchart of a PTT directory update operation;

FIG. 10 is a flowchart of a one-to-one PTT call operation;

FIG. 11 shows an example of a directory menu screen;

FIG. 12 shows an example of a contact list screen;

FIG. 13 shows example screens displayed on a calling party's mobile phone in a one-to-one PTT call;

FIG. 14 shows an example screen displayed on a called party's mobile phone in the one-to-one PTT call;

FIG. 15 is a flowchart of a group PTT Call operation;

FIG. 16 shows an example of a group list screen;

FIG. 17 shows example screens displayed on a calling party's mobile phone in a group PTT call; and FIG. 18 shows example screens displayed on a called party's mobile phone in the group PTT call.

DESCRIPTION OF THE PREFERRED EMBODIMENT

The following describes an embodiment of the present invention with reference to drawings.

1. PTT System

Figure 1:
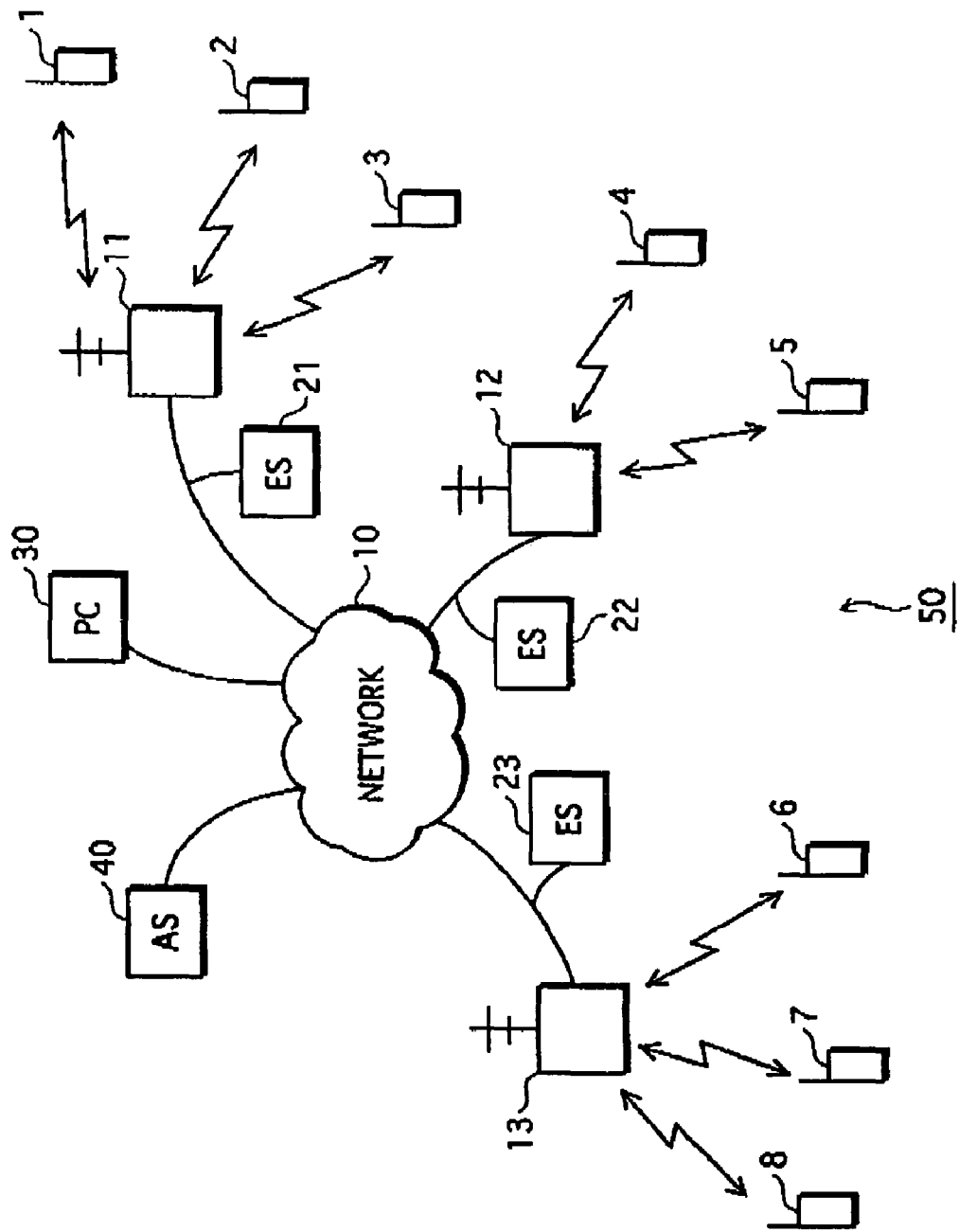
FIG. 1 shows a construction of a PTT system to which an embodiment of the present invention relates.

FIG. 1 shows a construction of a PTT system 50 to which the embodiment of the present invention relates.

As shown in the drawing, the PTT system 50 is roughly made up of a network 10, mobile phones 1 to 8, base stations 11 to 13, edge servers (ESs) 21 to 23, a personal computer (PC) 30, and an application server (AS) 40.

Note here that the present invention is not limited to the numbers of mobile phones, base stations, ESs, PCs, and ASs shown in FIG. 1. For example, thousands or tens of thousands of mobile phones may exist in the PTT system.

The base stations 11 to 13 each service a predetermined area, and connect with mobile phones located in that area.

The ESs 21 to 23 correspond one-to-one to the base stations 11 to 13 (e.g. the ES 21 corresponds to the base station 11). The ESs 21 to 23 each assign, upon receiving a mobile IP address assignment request from a mobile phone located in an area serviced by a corresponding base station, a mobile IP address to that mobile phone.

The mobile phones 1 to 8 each have a PUT function. If the mobile phone is switched on and the PTT function is in an active state, the mobile phone sends a mobile IP address assignment request to one of the ESs 21 to 23 corresponding to one of the base stations 11 to 13 that services an area where the mobile phone is located, upon connecting to the base station by radio. As one example, one of the mobile phones 1 to 3 sends a mobile IP address assignment request to the ES 21, upon connecting to the base station 11 by radio.

Having been assigned a mobile IP address by the ES, the mobile phone sends a login request to the AS 40 via the base station and the network 10, according to SIP (Session Initiation Protocol).

The PC 30 has a function of accessing the AS 40 and recording/updating a PTT directory.

The AS 40 is a server for mediating PTT calls between the mobile phones 1 to 8. In detail, the AS 40 performs processing such as management of mobile phones which have sent login requests according to SIP, synchronous management of a PTT directory of each mobile phone, acceptance of a request to register an image of a user of a mobile phone which has logged in, and mediation of a PTT call between mobile phones.

2. AS 40

Figure 2:
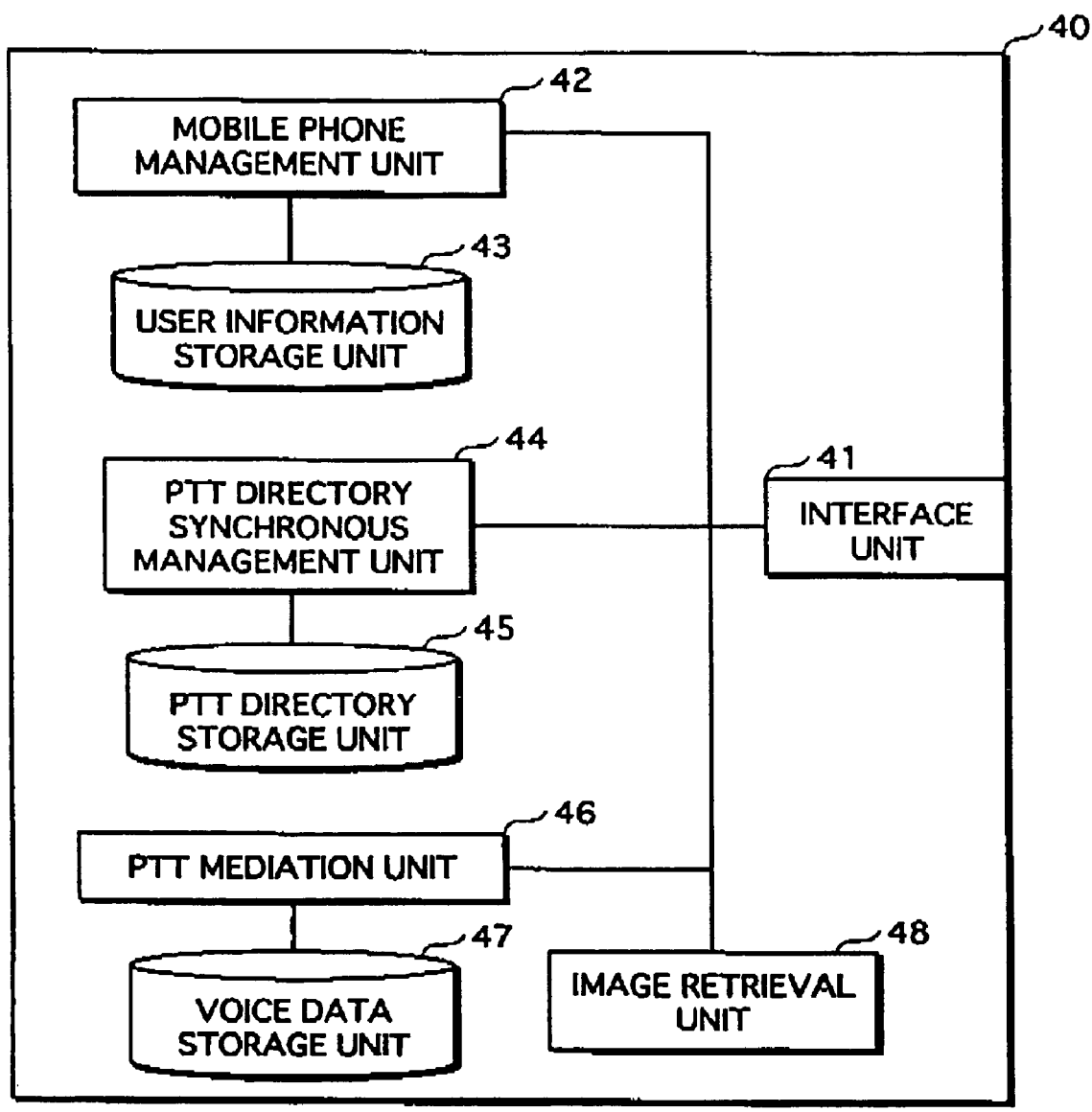
FIG. 2 shows a functional construction of an AS shown in FIG. 1.

FIG. 2 shows a functional construction of the AS 40.

In the drawing, the AS 40 includes an interface unit 41, a mobile phone management unit 42, a user information storage unit 43, a PTT directory synchronous management unit 44, a PTT directory storage unit 45, a PTT mediation unit 46, a voice data storage unit 47, and an image retrieval unit 48.

The interface unit 41 communicates with an external device connected to the network 10.

The mobile phone management unit 42 manages a mobile phone which has made a login request to the AS 40. When making the login request, the mobile phone sends a PTT call ID which is a phone identifier for identifying the mobile phone, to the AS 40. After granting the login request, the mobile phone management unit 42 stores the PTT call ID of the mobile phone into the user information storage unit 43 and manages the stored PTT call ID.

The mobile phone management unit 42 also manages an image of a user of the mobile phone. The image of the user is uploaded from the mobile phone or the PC 30 and stored in the user information storage unit 43 in correspondence with the PTT call ID of the mobile phone. For example, the upload of the image of the user is performed according to HTTP (HyperText Transfer Protocol).

The PTT directory synchronous management unit 44 synchronously manages a PTT directory with the mobile phone which has been permitted to log in.

The synchronous management referred to here is to manage identical PTT directories in the AS 40 and the mobile phone. If one PTT directory is updated, the other PTT directory is updated in the same way.

As one example, if new contact information is added to a PTT directory stored in the mobile phone 1, the mobile phone 1 changes version information of the PTT directory and uploads the PTT directory to the AS 40.

The PTT directory synchronous management unit 44 checks the version information of the PTT directory uploaded from the mobile phone 1. If a PTT directory of the mobile phone 1 with older version information is stored in the PTT directory storage unit 45, the PTT directory synchronous management unit 44 writes the uploaded PTT directory over the PTT directory stored in the PTT directory storage unit 45.

As another example, if the PC 30 updates the PTT directory of the mobile phone 1 and uploads it to the AS 40, the AS 40 informs the mobile phone 1 that the PTT directory of the mobile phone 1 has been uploaded. In response, the mobile phone 1 downloads the uploaded PTT directory from the AS 40, and writes the downloaded PTT directory over the PTT directory stored in the mobile phone 1.

Having downloaded the PTT directory, the mobile phone 1 informs the AS 40 of the completion of the download.

If the mobile phone 1 has failed to download the PTT directory for some reason, no information indicating the completion of the download is sent from the mobile phone 1 to the AS 40. In this case, the AS 40 re-requests the mobile phone 1 to download the PTT directory.

This re-request is made at the time when the mobile phone 1 logs in to the AS 40 or when the mobile phone 1 is assigned a mobile IP address.

For example, uploading and downloading a PTT directory are carried out according to HTTP. Here, only an updated part of the PTT directory is actually uploaded or downloaded.

A PTT directory can list contact names showing names or the like of contacts, PTT call IDs, and images of the contacts as contact information.

The PTT mediation unit 46 mediates a PTT call between mobile phones.

Upon receiving a PTT call initiation request from a mobile phone (i.e. a calling party's mobile phone), the PTT mediation unit 46 attempts to establish communication with a mobile phone designated by the calling party's mobile phone. If the designated mobile phone responds, the PTT mediation unit 46 transmits connection status information to the calling party's mobile phone and the responding mobile phone (i.e. a called party's mobile phone). The PTT mediation unit 46 then transmits an image retrieved by the image retrieval unit 48 (described later), to the called party's mobile phone.

After this, the PTT mediation unit 46 permits one of the mobile phones whose PTT button is being pressed to transmit voice communication, and transmits voice data to the other mobile phone whose PTT button is not being pressed.

For example, the transmission of the image to the called party's mobile phone and the transmission/reception of the voice data during PTT conversation are performed according to RTP (Real-time Transport Protocol). Here, the voice data sent from the mobile phone whose PTT button is being pressed is stored in the voice data storage unit 47 and then sent to the mobile phone whose PTT button is not being pressed.

There are two types of PTT calls: one-to-one PTT call and group PTT call. The one-to-one PTT call is a PTT call performed between two mobile phones. The group PTT call is a PTT call performed between a plurality of mobile phones that belong to a group established in a PTT directory beforehand.

In the case of a one-to-one PTT call, the PTT mediation unit 46 performs mediation based on a PTT call ID of a calling party's mobile phone and a PTT call ID of a called party's mobile phone.

In the case of a group PTT call, the PTT mediation unit 46 sends an URI (Uniform Resource Identifier) which is set as an access destination of the group PTT call, to a calling party's mobile phone and each called party's mobile phone.

Upon receiving the URI from the AS 40, the calling party's mobile phone and each called party's mobile phone conduct the group PTT call with the ORI as the access destination.

The image retrieval unit 48 retrieves, from the user information storage unit 43 or the PTT directory storage unit 45, an image of the other participant(s) to be sent to a called party's mobile phone, based on a PTT call ID of the other participant(s).

In the case of a one-to-one PTT call, the image retrieval unit 48 retrieves an image corresponding to a PTT call ID of a calling party's mobile phone. In the case of a group PTT call, the image retrieval unit 48 retrieves an image corresponding to a PTT call ID of a calling party's mobile phone and an image corresponding to a PTT call ID of each mobile phone that belongs to a group designated by the calling party.

The image retrieval unit 48 outputs the retrieved image to the PTT mediation unit 46, which sends the image to the called party's mobile phone.

Note here that, in the group PTT call, all mobile phones belonging to the designated group are called parties' mobile phones. For each such called party, the other participants in the group PTT call are the calling party and the rest of the called parties. This being so, images corresponding to the PTT call ID of the calling party's mobile phone and PTT call IDs of the rest of the called parties, mobile phones are sent to the called party's mobile phone as the images of the other participants.

3. Mobile Phone

A construction of a PTT-capable mobile phone is described below, taking the mobile phone 1 as one example.

Figure 3:
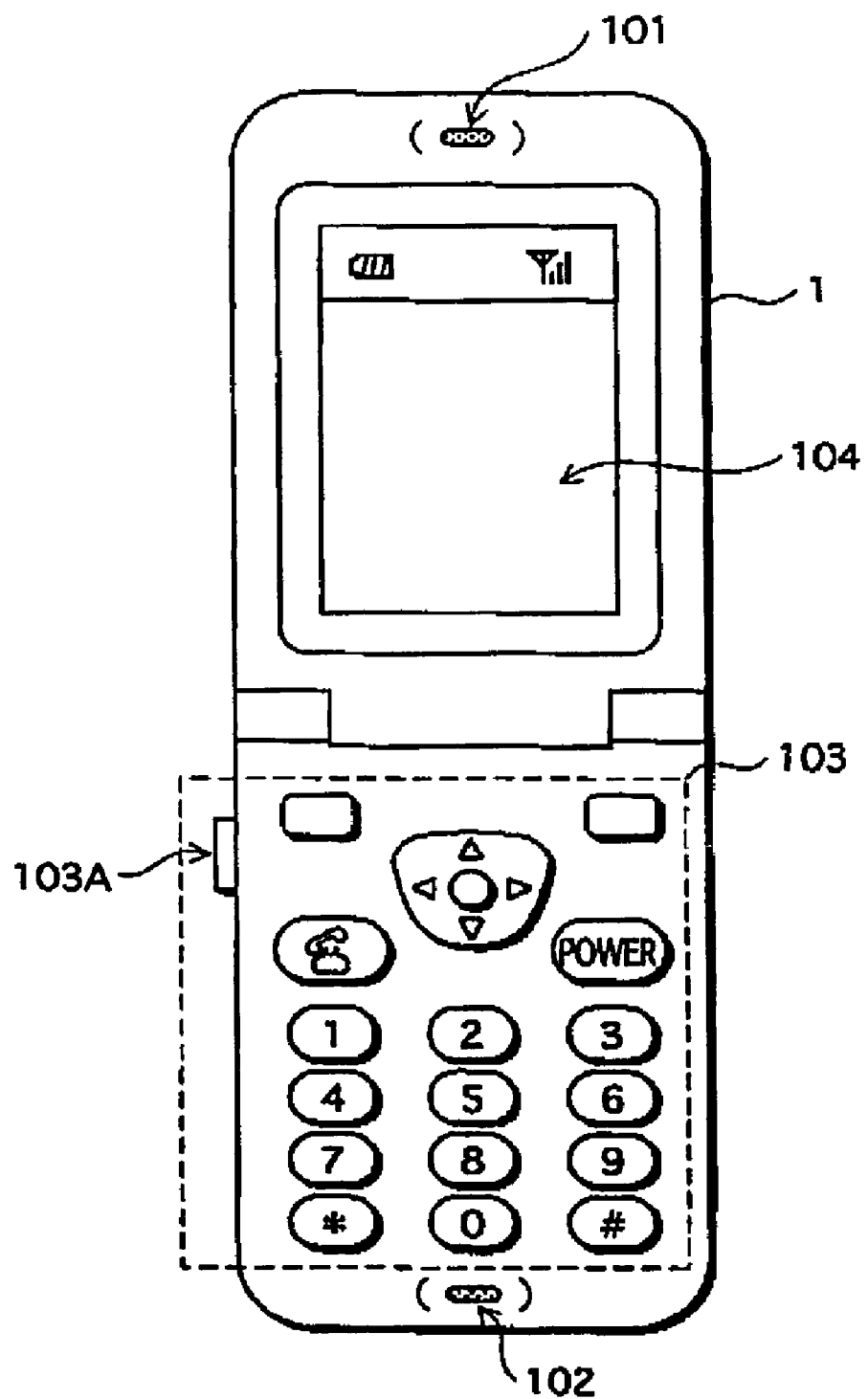
FIG. 3 shows an example appearance of a PTT-capable mobile phone shown in FIG. 1.
Figure 4:
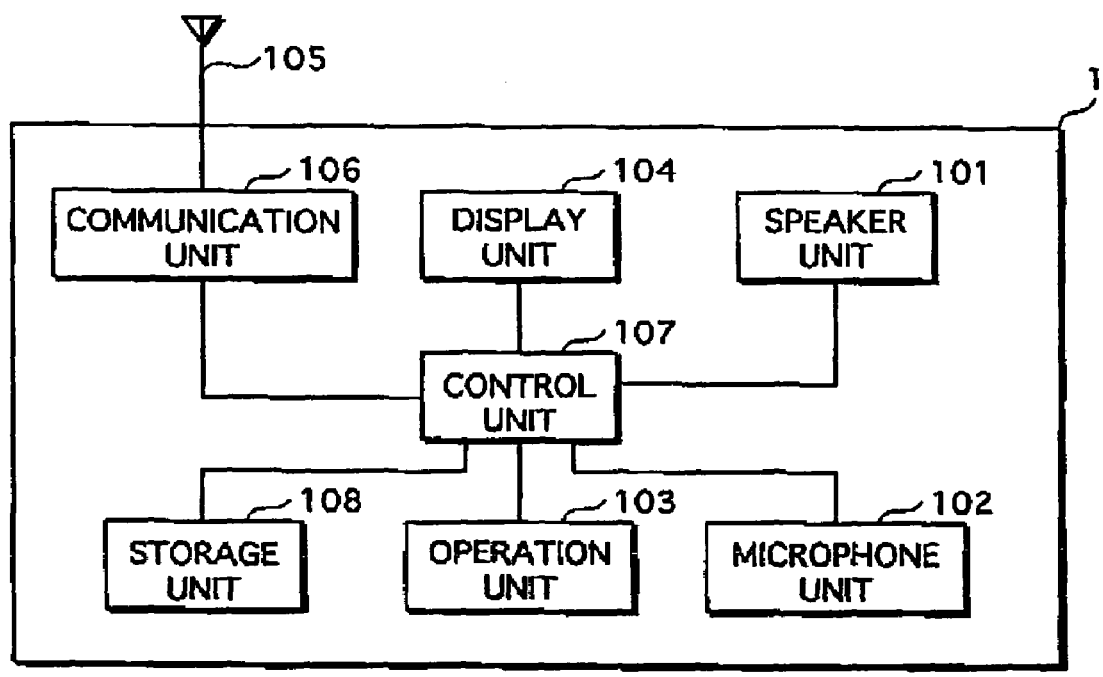
FIG. 4 shows a functional construction of the PTT-capable mobile phone.

FIG. 3 shows an example appearance of the mobile phone 1. FIG. 4 is a functional block diagram of the mobile phone 1. In FIGS. 3 and 4, same functional units have been given same reference numerals.

As shown in FIGS. 3 and 4, the mobile phone 1 includes a speaker unit 101, a microphone unit 102, an operation unit 103 (including a PTT button 103A), a display unit 104, an antenna 105, a communication unit 106, a control unit 107, and a storage unit 108. The mobile phones 2 to 8 have the same construction as the mobile phone 1.

The speaker unit 101 outputs a voice signal sent from the control unit 107. The speaker unit 101 also outputs, upon reception of an incoming PTT call, a ring alert made up of a melody pattern and various tone colors under control of the control unit 107.

The microphone unit 102 collects voices, converts the voices into an electric signal, and outputs the electric signal to the control unit 107.

The operation unit 103 has the PTT button 103A, in addition to various functional buttons provided on a typical mobile phone such as ten numeric buttons from 0 to 9, an on-hook button, and an off-hook button. The operation unit 103 receives an instruction made from a user by pressing any of these buttons.

The display unit 104 displays a standby screen, a user image register screen, a PTT directory register screen, a PTT directory screen, and the like, under control of the control unit 107.

The antenna 105 is similar to an antenna of a typical mobile phone, and transmits/receives a carrier wave that carries audio, data, and so on. The antenna 105 outputs a received carrier wave signal to the communication unit 106.

The communication unit 106 performs a series of operations relating to transmission/reception, such as modulation/demodulation, amplification, A/D or D/A conversion, on the carrier wave signal output from the antenna 105 or a compressed signal of audio and the like output from the control unit 107. These functions of the communication unit 106 are similar to those equipped in a typical mobile phone.

The control unit 107 is constituted by a microprocessor, a DSP (Digital Signal Processor), and the like, and controls each functional unit in the mobile phone 1 according to programs stored in the storage unit 108. For example, the control unit 107 performs PTT control in the following manner. When the mobile phone 1 is switched on while the PTT function is in an active state, the control unit 107 instantly connects to the base station 11 by radio, and makes a mobile IP address assignment request to the ES 21 corresponding to the base station 11. The control unit 107 also performs a user image register operation, a PTT directory register operation, and an operation of displaying a received image of the other participant(s) in a PTT call. These operations are explained in detail later.

The storage unit 108 stores a PT directory (described below) of the mobile phone 1, an image of the user of the mobile phone 1, and the like, in addition to the aforementioned programs.

4. PTT Directory

A PTT directory is described below.

Figure 5:
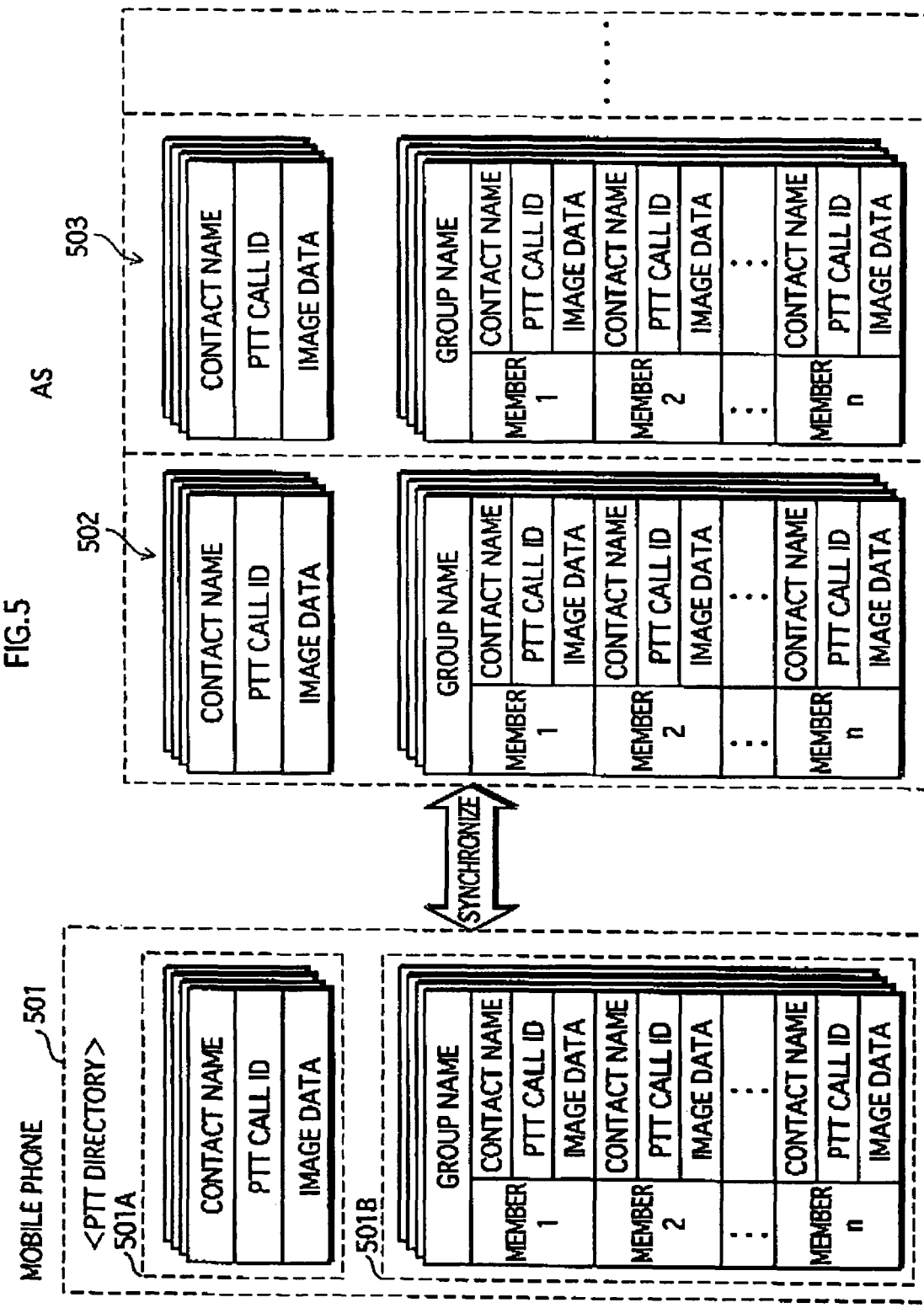
FIG. 5 shows data structures of PTT directories.

FIG. 5 shows PTT directories synchronously managed in a mobile phone and the AS 40.

A PTT directory 503 includes two types of PTT directories: a PTT directory 501A for one-to-one PTT calls in which contact information is recorded in units of individual contacts; and a PTT directory 501B for group PTT calls in which contact information is recorded in units of groups of contacts.

Which is to say, the PTT directory 501A is a database of contact information of individual contacts, whereas the PTT directory 501B is a database of group information which is made up of a group name and contact information of individual contacts belonging to a group identified by the group name.

In the PTT directory 501, contact information of each contact is composed of a contact name, a PTT call ID, and an image of the contact.

The contact name is ID information for helping a user of the mobile phone recognize the contact. The user can set a name or nickname of the contact as the contact name, though there are limitations on the types and number of characters that can be used.

The PTT call ID is information which needs to be included in the contact information. The PTT call ID is a phone identifier of a mobile phone of the contact.

The image of the contact is optional information which the user can input voluntarily, though there is a limitation on a data size of the image.

The PTT directory synchronous management unit 44 in the AS 40 synchronously manages a PTT directory with each mobile phone which has logged in. A PTT directory of each such mobile phone (e.g. PTT directories 502 and 503) is stored in the PTT directory storage unit 45.

Note here that the aforementioned contact information is created as a result of the user Inputting the information in the mobile phone or the PC 30.

5. Operations

Operations of a mobile phone and the AS 40 are described below, taking the mobile phone 1 as one example.

5.1. User Image Register Operation

Figure 6:
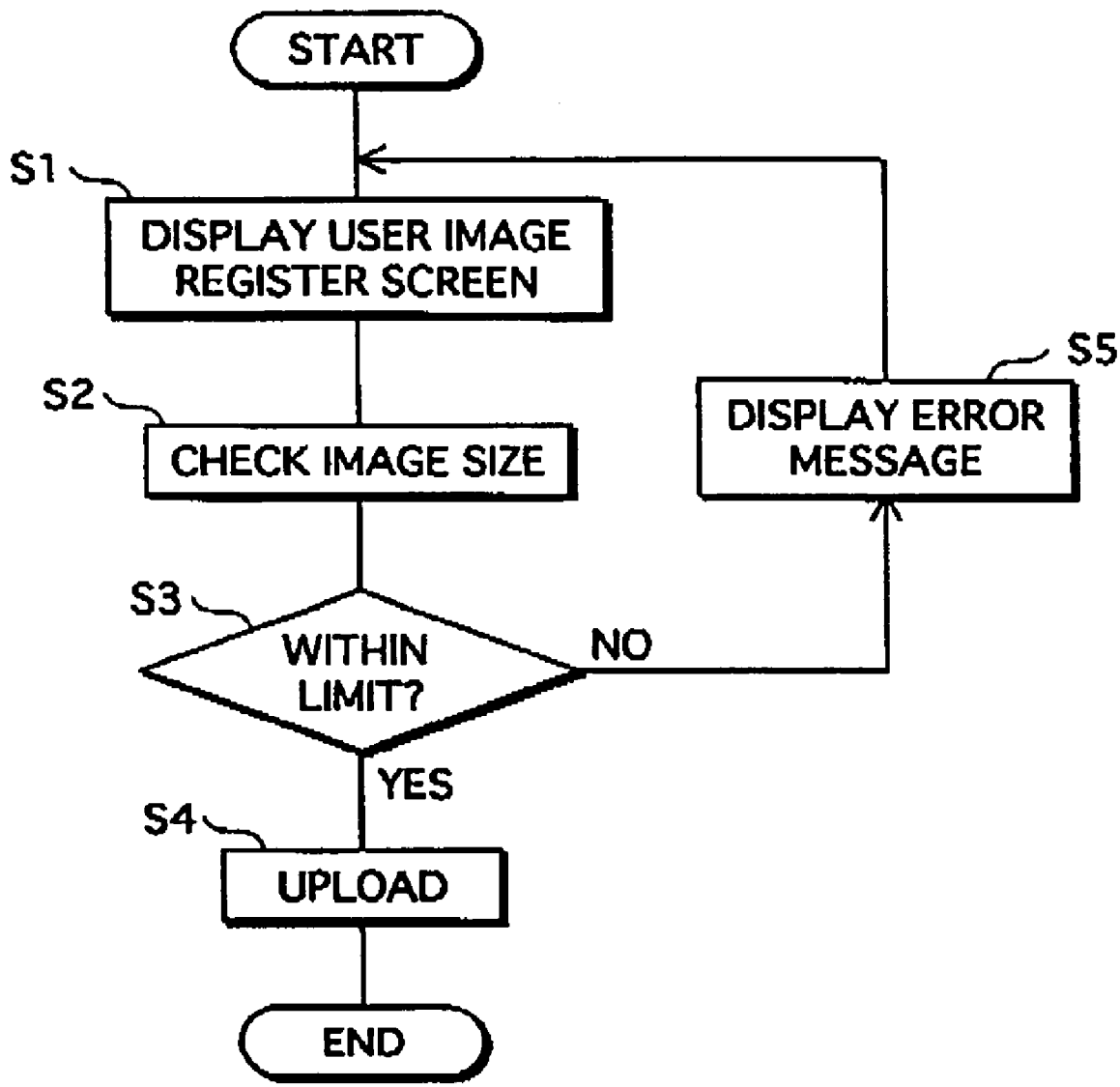
FIG. 6 is a flowchart of a user image register operation.

FIG. 6 is a flowchart of a user image register operation by the mobile phone 1.

In response to a user image register screen display instruction from the user, the control unit 107 has the display unit 104 display a user image register screen (S1).

When the user selects an image of the user stored in the storage unit 108 on the user image register screen, the control unit 107 checks a size of the selected image (S2).

If the size is within a specified limit (S3: YES), the mobile phone 1 uploads the image to the AS 40 (S4). When uploading the image, the mobile phone 1 uploads a PTT call ID of the mobile phone 1, too. This completes the operation.

If the size exceeds the specified limit (S3: NO), the control unit 107 has the display unit 104 display an error message (S5). The operation then returns to step S1.

The above upload of the image may be performed at the time when the mobile phone 1 logs in to the AS 40. Also, the upload may be performed only if a filename of the selected image is different from a filename of an image uploaded at an immediately preceding login. Furthermore, an image currently registered in the AS 40 can be deleted by performing the upload without selecting any image.

Also, the upload of the image can be made not only from the mobile phone 1 but also from the PC 30. In this case too, the PC 30 uploads the PTT call ID of the mobile phone 1 together with the image so that the image is stored in the AS 40 in correspondence with the PTT call ID.

5.2. User Image Register Acceptance Operation

Figure 7:
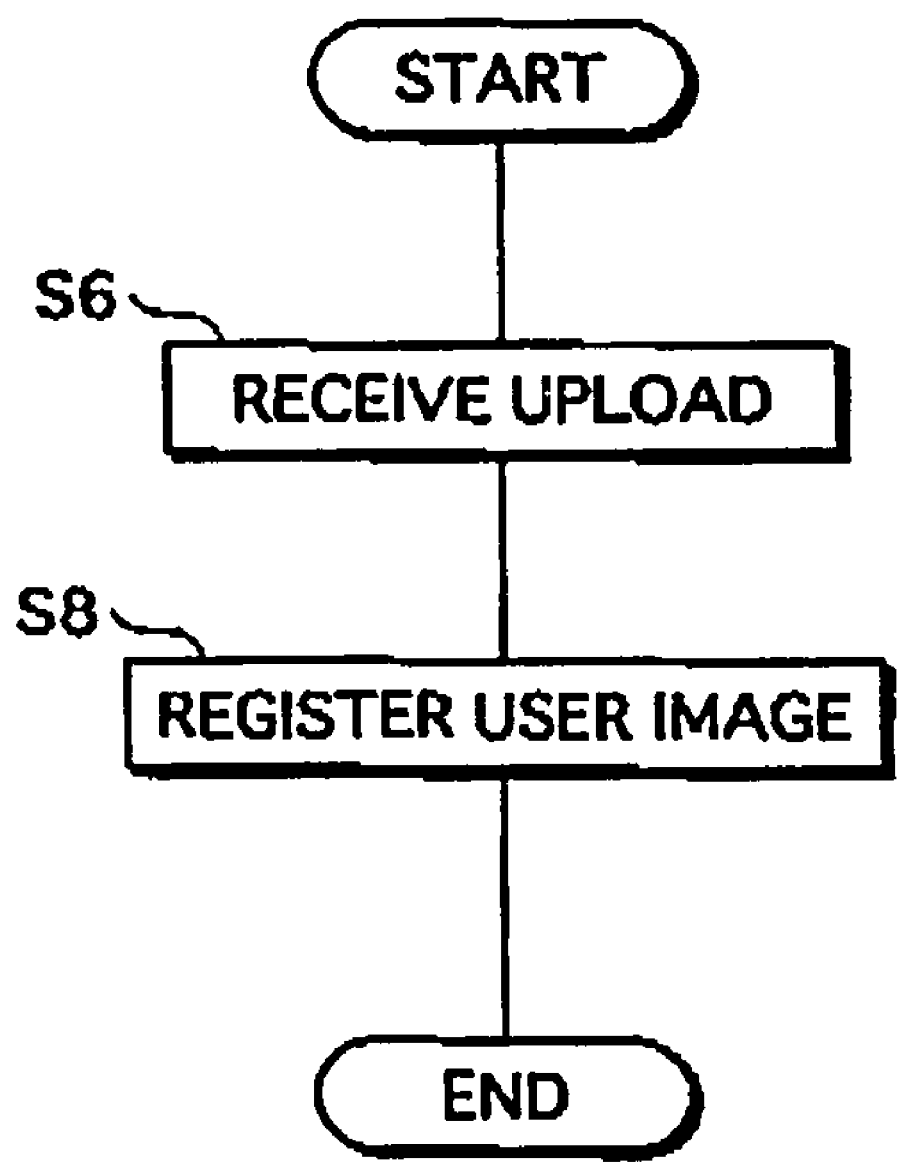
FIG. 7 is a flowchart of a user image register acceptance operation.

FIG. 7 is a flowchart of a user image register acceptance operation by the AS 40.

Upon receiving the image of the user of the mobile phone 1 and the PTT call ID of the mobile phone 1 uploaded from the mobile phone 1 or the PC 30 (S6), the AS 40 stores the image of the user and the PTT call ID in the user information storage unit 43 in correspondence with each other (S8).

5.3. PTT Directory Register Operation

Figure 8:
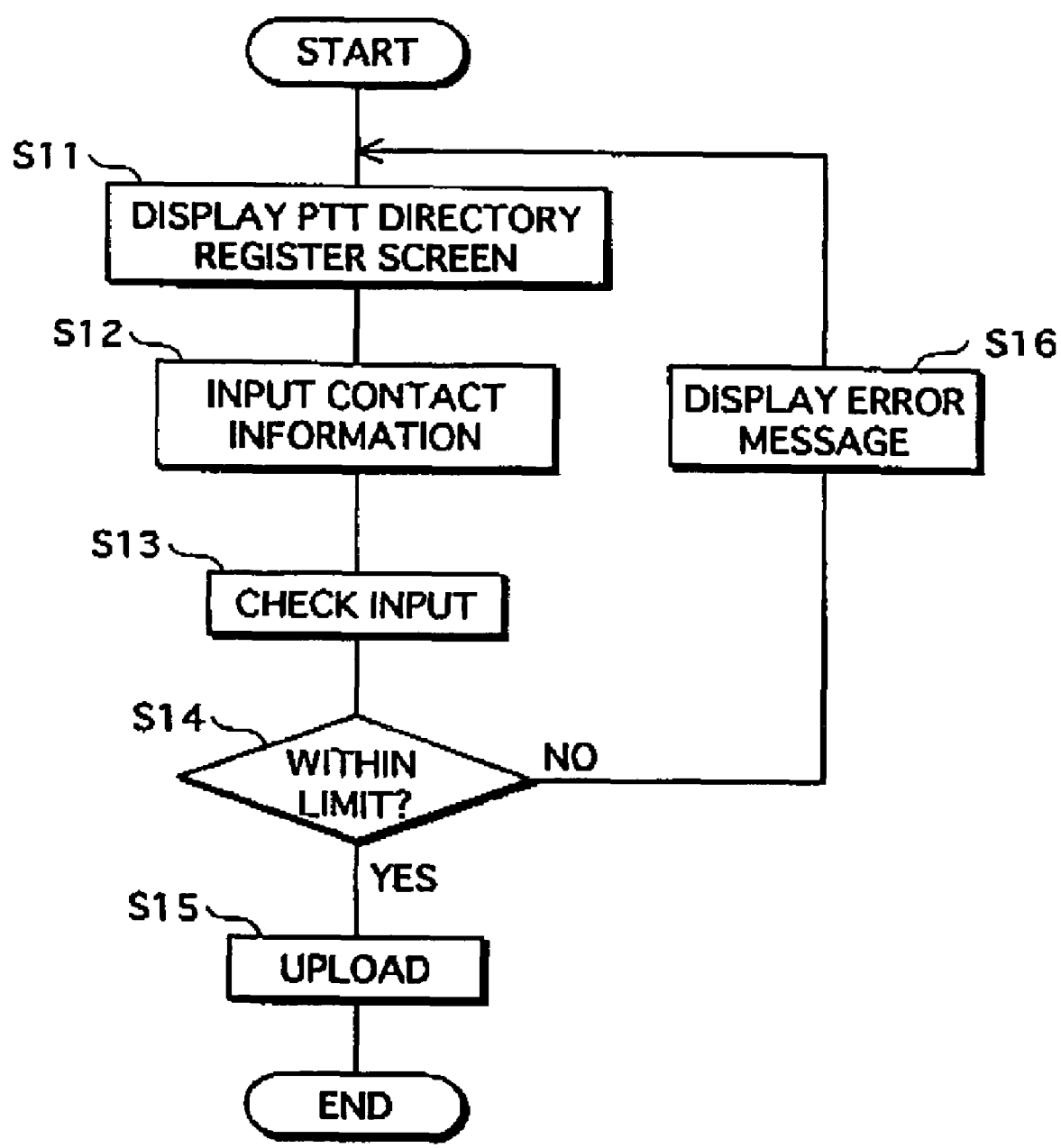
FIG. 8 is a flowchart of a PTT directory register operation.

FIG. 8 is a flowchart of a PTT directory register operation by the mobile phone 1.

In response to a PTT directory register screen display instruction from the user, the control unit 107 has the display unit 104 display a PTT directory register screen (511).

When the user inputs a contact name and a PTT call ID and selects an image of a contact on the PTT directory register screen (S12), the control unit 107 checks a number of characters of the contact name and a size of the image (S13).

If the number of characters of the contact name and the size of the image are both within specified limits (S14: YES), the control unit 107 adds the contact name, the PTT call ID, and the image to the PTT directory stored in the storage unit 108 as contact information. The mobile phone 1 then uploads the PTT directory (S15). This completes the operation.

If any of the number of characters and the size of the image exceeds a corresponding specified limit (S14: NO), the control unit 107 has the display unit 104 display an error message (S16). The operation then returns to step 511.

5.4. PTT Directory Update Operation

Figure 9:
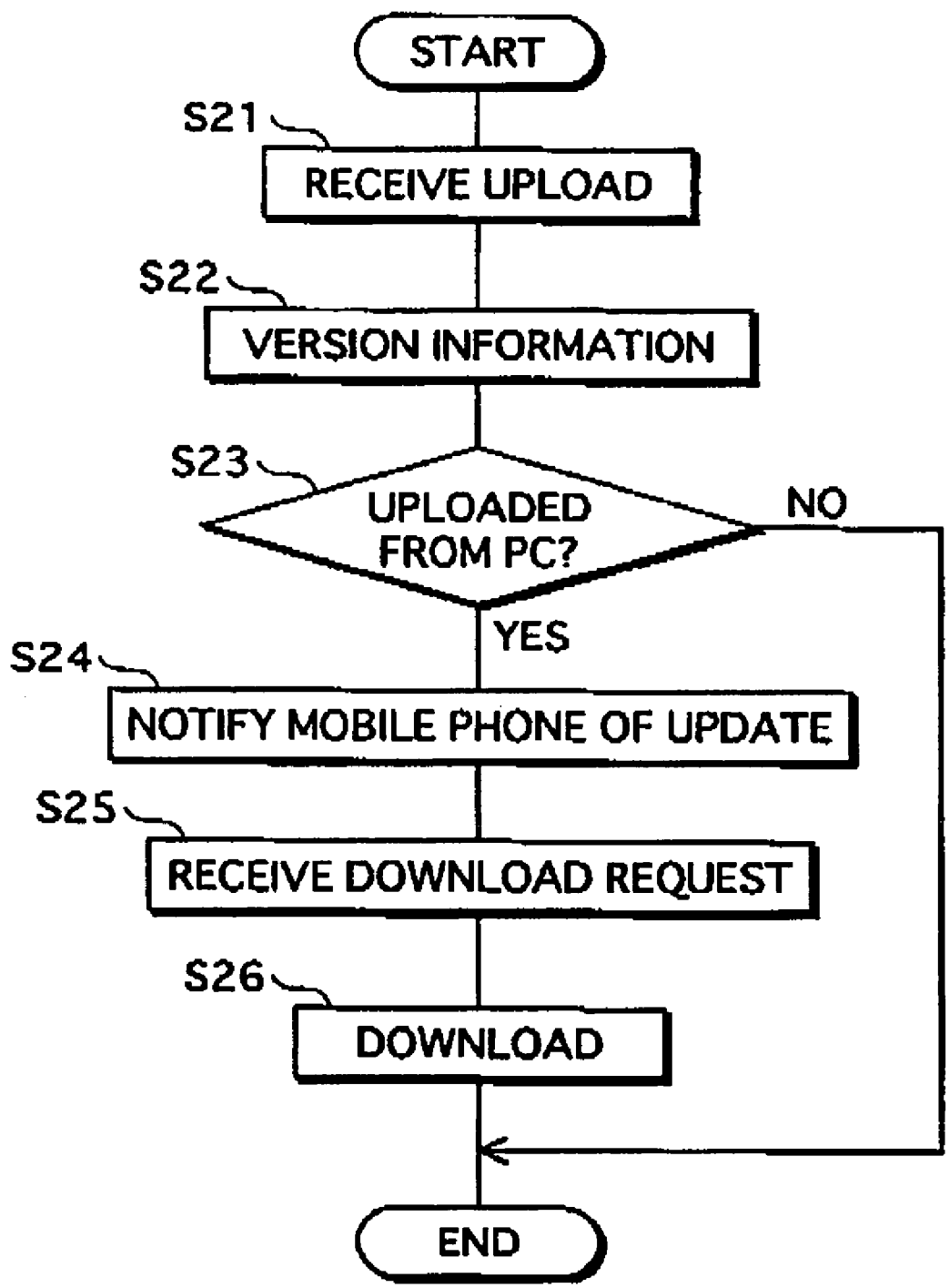

FIG. 9 is a flowchart of a PTT directory update operation by the AS 40.

Upon receiving the PTT directory uploaded together with the PTT call ID of the mobile phone 1 (S21), the AS 40 searches the PTT directory storage unit 45 for a PTT directory corresponding to the PTT call ID. If such a PTT directory is found in the PTT directory storage unit 45, the AS 40 compares version information of the stored PTT directory with version information of the uploaded PTT directory, and replaces the stored PTT directory with the uploaded PTT directory if the uploaded PTT directory is newer (S22).

Following this, if the PTT directory has been uploaded from the PC 30 (S23: YES), the AS 40 notifies the mobile phone 1 that the PTT directory of the mobile phone 1 has been updated (S24).

In response, the mobile phone 1 makes a PTT directory download request to the AS 40. Upon receiving the request (S25), the AS 40 downloads the PTT directory to the mobile phone 1 (S26). This completes the operation.

5.5. One-To-One PTT Call

FIG. 10 is a flowchart of operations of a calling party's mobile phone, a called party's mobile phone, and the AS 40 in a one-to-one PTT call.

It is assumed here that both the calling party's mobile phone and the called party's mobile phone have already logged in to the AS 40.

To initiate the one-to-one PTT call, the calling party's mobile phone designates the called party's mobile phone, by sending a PTT call ID of the calling party's mobile phone and a PTT call ID of the called party's mobile phone to the AS 40 according to SIP (S31).

The AS 40 receives these PTT call IDs (S32), and sends INVITE information indicating that the PTT call initiation request has been made, to the called party's mobile phone according to SIP (S33).

The called party's mobile phone receives the INVITE information (S34), and responds to the received INVITE information (S35).

Upon receiving the response, the AS 40 sends connection status information indicating that connection has been established, to the calling party's mobile phone and the called party's mobile phone (S36).

Until the connection is established, the calling party's mobile phone displays, on its display unit, contact information of the called party which is made up of a contact name, a PTT call ID, and an image, together with a message "CALLING" (S37). Upon receiving the connection status information from the AS 40, the calling party's mobile phone changes the display from "CALLING" to "CONNECT" (S38).

Upon receiving the connection status information from the AS 40, the called party's mobile phone displays a message "CONNECT" on its display unit (S39).

After sending the connection status information, the AS 40 retrieves an image corresponding to the PTT call ID of the calling party's mobile phone (S40).

The AS 40 sends the retrieved image to the called party's mobile phone together with a contact name of the calling party and the PTT call In of the calling party's mobile phone (S41).

The called party's mobile phone receives the contact name, the PTT call ID, and the image of the calling party, and displays these information on its display unit (S42).

5.5.1. Display Screens on the Calling Party's Mobile Phone

Screens displayed on the display unit of the calling party's mobile phone in the one-to-one PTT call are explained below.

FIG. 11 shows an example of a directory menu screen displayed on the display unit of the calling party's mobile phone in response to the user's display instruction.

In the drawing, a menu screen 1100 shows three items, i.e. a directory (general directory), a PTT directory for one-to-one PTT calls, and a PTT directory for group PTT calls.

When the user selects one of the directories, a list of contact information recorded in the selected directory is displayed.

Suppose the user selects the PTT directory for one-to-one PTT calls on the menu screen 1100. As a result, a list of contact information recorded in the PTT directory for one-to-one PTT calls is displayed as shown in FIG. 12.

In the drawing, a list screen 1200 shows a contact name, a PTT call ID, and a face photo of each contact recorded in the PTT directory for one-to-one PTT calls.

Suppose the user designates Ichiro as the called party on the list screen 1200. As a result, a screen 1301 shown in FIG. 13 is displayed on the calling party's mobile phone.

The screen 1301 contains call status information 1302 showing a current call status, a face photo 1303 of Ichiro who is designated as the called party, a contact name 1304, and a PTT call ID 1305.

After this, upon receiving connection status information from the AS 40, a screen 1306 is displayed in which the call status information 1302 "CALLING" has been changed to call status information 1307 "CONNECT".

5.5.2. Display Screens on the Called Party's Mobile Phone

A screen displayed on the display unit of the called party's mobile phone in the one-to-one PTT call is explained below.

The called party's mobile phone receives a contact name, a PTT call ID, and an image of the calling party from the AS 40, and displays them on its display unit.

FIG. 14 shows an example of an incoming call screen displayed on the display unit of the called party 's mobile phone.

In the drawing, an incoming call screen 1400 shows a contact name and a face photo of the calling party and a PTT call ID of the calling party's mobile phone, together with a message "CONNECT".

From the face photo of the calling party displayed in this way, the called party can recognize the calling party easily.

5.6. Group PTT Call

FIG. 15 is a flowchart of operations of a calling party's mobile phone, a called party's mobile phone, and the AS 40 in a group PTT call.

It is assumed here that both the calling party's mobile phone and the called party's mobile phone have already logged in to the AS 40. Also, though there are actually a plurality of called parties' mobile phones in a group PTT call, the following explanation focuses on the operation of one called party's mobile phone, since all called parties' mobile phones operate in the same manner.

To initiate the group PTT call, the calling party's mobile phone designates a group, by sending a PTT call ID of the calling party's mobile phone and a group name of the group to the AS 40 according to SIP (S51).

Upon receiving the PTT call ID and the group name (S52), the AS 40 specifies each mobile phone that belongs to the group, from a PTT directory stored in the PTT directory storage unit 45 in correspondence with the PTT call ID of the calling party's mobile phone. The AS 40 transmits INVITE information indicating that the PTT call initiation request has been made, to each mobile phone according to SIP (S53).

Having received the INVITE information (S54), the mobile phone, i.e. the called party's mobile phone, responds to the received INVITE information (S55).

If any of the mobile phones that belong to the group has logged out of the AS 40 for some reason, such as the mobile phone being located in an environment where radio reception is impossible (e.g. inside a tunnel or underground) or a battery of the mobile phone being running out, that mobile phone cannot receive the INVITE information, and therefore cannot respond to the INVITE information.

The AS 40 excludes such a non-responding mobile phone as being unable to participate in the group PTT call. The AS 40 transmits connection status information which indicates establishment of connection and includes a PTT call ID of each mobile phone that can participate in the group PTT call, to the calling party's mobile phone and the mobile phones which responded to the INVITE information (S56).

Until the connection is established, the calling party's mobile phone displays, on its display unit, an image of each called party in the group and a message "CALLING" (S57). Upon receiving the connection status information from the AS 40, the calling party's mobile phone changes the display from "CALLING" to "CONNECT". If any of the mobile phones in the group did not respond, a PTT call ID of that mobile phone is not included in the connection status information. In this case, the calling party's mobile phone cancels an image of a called party corresponding to such a PTT call ID on the display unit (S58).

Upon receiving the connection status information from the AS 40, the called party's mobile phone displays a character string "CONNECT" (S59).

After sending the connection status information the AS 40 retrieves images corresponding to the PTT call ID of the calling party's mobile phone and the PTT call ID of each mobile phone which responded to the INVITE information (S60).

The AS 40 transmits the retrieved images to each mobile phone which responded to the INVITE information (S61). In more detail, the AS 40 transmits, to each responding mobile phone, images of the other participants in the group PTT call, namely, an image corresponding to the PTT call ID of the calling party's mobile phone and images corresponding to PTT call IDs of the rest of the responding mobile phones.

Upon receiving the images from the AS 40, the called party's mobile phone displays the received images on its display unit (S62).

5.6.1. Display Screens on the Calling Party's Mobile Phone

Screens displayed on the display unit of the calling party's mobile phone in the group PTT call are explained below.

When the PTT directory for group PTT calls is selected on the directory menu screen 1100 shown in FIG. 11, a list screen 1600 showing a list of groups recorded in the PTT directory for group PTT calls is displayed as shown in FIG. 16.

When the group "high school classmates" is selected on this list screen 1600, a screen 1701 shown in FIG. 17 is displayed.

The screen 1701 Includes call status information 1702, face photos 1703, 1704, and 1705 of contacts belonging to the selected group, and a group name 1706.

After this, upon receiving connection status information from the AS 40, a screen 1707 is displayed in which the call status information 1702 "CALLING" has been changed to call status information 1708 "CONNECT", and the face photo 1705 of a non-responding contact has been changed to a canceled face photo 1709.

5.6.2. Display Screens on the Called Party's Mobile Phone

Screens displayed on the display unit of the called party's mobile phone in the group PTT call are explained below.

The called party's mobile phone receives images of the other participants from the AS 40, and displays the received images on its display unit.

FIG. 18 shows example incoming call screens displayed on the display unit of the called party's mobile phone.

In the drawing, an incoming call screen 1801 includes call status information 1802, a face photo 1803 of the calling party, a face photo 1804 of another called party which responded to the INVITE information, and a group name 1805.

When the calling party presses a PTT button on his or her mobile phone, the AS 40 grants voice transmission rights to the calling party's mobile phone, and also sends the PTT call ID of the calling party's mobile phone to each called party's mobile phone participating in the group PTT call.

Upon receiving the PTT call ID, the called party's mobile phone displays a screen 1806 in which the face photo 1803 of the calling party has been changed to an enlarged face photo 1808. Also, since the called party's mobile phone is going to receive voice communication from the calling party's mobile phone, the call status information 1802 has been changed to call status information 1807 "RECEIVING".

From the displayed images, the called party can easily identify the other participants in the group PTT call, and also easily recognize the current speaker in the group PTT call.

(Modifications)

Although the present invention has been described by way of the above embodiment, the present invention is not limited to such. Example modifications are given below.

(1) The above embodiment describes the case where the AS 40 sends, only to a called party's mobile phone, an image of the other participant(s) in a PTT call. If a PTT directory of a calling party's mobile phone does not contain an image of the other participant(s) (i.e. the called party or parties), the AS 40 may also retrieve the image of the other participant(s) and send the retrieved image to the calling party's mobile phone.

For example, when the calling party designates a contact whose image is not recorded in the PTT directory as the called party, the calling party's mobile phone sends a request for an image of the called party to the AS 40. In response, the AS 40 retrieves the image of the called party and sends the retrieved image to the calling party's mobile phone.

Also, when receiving connection status information from the AS 40, the called party's mobile phone may check whether an image corresponding to a PTT call ID included in the connection status information is recorded in a PTT directory stored therein. If the image corresponding to the PTT call ID is recorded in the PTT directory, the called party's mobile phone notifies the AS 40 not to send the image. This saves the AS 40 from searching for the image unnecessarily.

(2) The above embodiment describes the case where an image of a current speaker in a group PTT call is enlarged. Alternatively, the image of the current speaker may be marked with a thick-line box or caused to blink. So long as the image of the current speaker is distinguished from the images of the other participants, any display style can be employed.

(3) The above embodiment describes the case where each mobile phone can record an image of a contact in a PTT directory stored therein, but the present invention is also applicable to the case where an image of a contact cannot be recorded in a PTT directory. In this case, every mobile phone needs to register an image of a user of the mobile phone to the AS 40, so that the AS 40 can search the user information storage unit 43 for an image of each participant in a PTT call.

(4) Programs that cause a program-executable PTT-capable mobile phone and a program-executable AS to execute the processing steps of the above embodiment (e.g. the steps shown in FIGS. 6 to 10 and 15) maybe distributed having been recorded onto recording media or by being transmitted via a communication path.

Examples of such a recording medium are an IC card, an optical disc, a flexible disc, and a ROM. The programs may then be installed into the PTT-capable mobile phone and the AS. By executing the installed programs, the PTT-capable mobile phone and the AS can achieve the functions described in the above embodiment.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A PTT (push to talk) system that includes a plurality of mobile phones including PTT capability and a display unit, and a server which mediates a PTT call between mobile phones,
    the server comprising:
    a storage unit stores a phone identifier of a mobile phone and an image related to the phone identifier;
    a retrieval unit retrieves the image from the storage unit; and
    a sending unit sends the image retrieved by the retrieval unit to at least one mobile phone,
    wherein the display unit of the mobile phone displays the image sent from the server,
    wherein the PTT call is a group call between the plurality of mobile phones that belong to the group,
    the storage unit stores a group identifier of the group, the phone identifier and the image related to the group identifier, and
    the retrieval unit retrieves the image related to the phone identifier that belong to the group from the storage unit,
    wherein the server further comprising,
    a PTT mediation unit determines one of the mobile phones as a transmitting mobile phone,
    wherein the sending unit sends a phone identifier of the transmitting mobile phone to the at least one other mobile phone if the PTT mediation unit changes the transmitting mobile phone, and
    in the at least one other mobile phone, the display unit displays the image related to the phone identifier and makes a different display style from the mobile phone other than the transmitting mobile phone when the phone identifier is sent from the server.

2. The PTT system according to claim 1, wherein the display unit displays the image related to the phone identifier of the transmitting mobile phone larger than the other image of the mobile phone.

3. The PTT system according to claim 1, wherein the mobile phone, further comprising a request sending unit operable to send a request to register the phone identifier and image from the mobile phone to the server.

4. A PTT-capable mobile phone comprising
    a display unit displays any of an image related to a phone identifier of the mobile phone and an image related to a phone identifier of another mobile phone in the PTT call,
    a reception unit receives any of an image related to a phone identifier of the mobile phone and an image related to a phone identifier of another mobile phone stored in a server mediating a PTT call from the server,
    wherein the display unit displays the image received from the server,
    the PTT call is a group call between a plurality of the mobile phones,
    the reception unit receives a phone identifier of a transmitting mobile phone from the server, and
    the display unit displays an image related to the phone identifier and makes a different display style from the mobile phones other than the transmitting mobile phone.

5. The mobile phone according to claim 4 further comprising
    a request sending unit sends a request to register a phone identifier of the mobile phone and the image of the mobile phone to the server.

6. A PTT (push to talk) system comprising;
    a plurality of PTT mobile phones each including PTT capability, a display unit for displaying images, means for storing image data of a user in the PTT mobile phone and means for transmitting the image data of the user with an ID (phone identification) of the mobile phone; and
    a server for mediating a PTT call between PTT mobile phones including
        a storage unit storing image data of the users and the related IDs of the plurality of PTT mobile phones transmitted from each of the plurality of PTT mobile phones,
        a retrieval unit retrieves, from the storage unit, the related image data of the user of the ID of a PTT mobile phone involved in the PTT call, and
        a sending unit sending the retrieved image data of the user to at least one other mobile phone connected by the server in the PTT call,
        wherein the display in the at least one other PTT mobile phone displays the image of the user sent from the server and each of the plurality of PTT mobile phones includes means for altering an image of the user upon receipt of an ID from the server to indicate a receipt of voice communications from that PTT mobile phone ID.

7. The PTT system of claim 6 wherein each of the plurality of PTT mobile phones includes means for checking the image size of the stored image data of the user and means for displaying an error message to the user if a displayed image from the stored image data is not within a predetermined limit prior to transmitting the image data of the user.

8. The PTT system of claim 6 wherein the server can provide a group call between PTT mobile phones that belong to one group and provide image data of users within the group and IDs to each PTT mobile phone in the group and the altering of the image of the user sending the voice communication is made larger than the user receiving the voice communication.

* * * * *